United States Patent
Tsuchikawa

(10) Patent No.: US 8,206,263 B2
(45) Date of Patent: Jun. 26, 2012

(54) TRACTION CONTROL SYSTEM FOR VEHICLE

(75) Inventor: Haruhisa Tsuchikawa, Yokohama (JP)

(73) Assignee: Nissan Motor Co., Ltd., Yokohama-shi, Kanagawa ( * ) Notice: Subject to any disclaimer, the term of this patent is extended or adjusted under 35 U.S.C. 154(b) by 247 days.

(21) Appl. No.: 12/811,267

(22) PCT Filed: Feb. 27, 2009

(86) PCT No.: PCT/IB2009/000429
§ 371 (c)(1),
(2), (4) Date: Jun. 30, 2010

(87) PCT Pub. No.: WO2009/109840
PCT Pub. Date: Sep. 11, 2009

(65) Prior Publication Data
US 2010/0298092 A1    Nov. 25, 2010

(30) Foreign Application Priority Data

Mar. 3, 2008   (JP) .................................. 2008-051518
Jan. 13, 2009  (JP) .................................. 2009-004254

(51) Int. Cl.
*B60W 10/00*    (2006.01)
*B60K 28/16*    (2006.01)

(52) U.S. Cl. ......................................... 477/71; 180/197
(58) Field of Classification Search .................... 477/71, 477/78, 904
See application file for complete search history.

(56) References Cited

U.S. PATENT DOCUMENTS

| 6,330,927 | B1 * | 12/2001 | Tokuda ........................ 180/197 |
| 7,058,498 | B2 * | 6/2006 | Kano et al. ...................... 701/67 |
| 7,553,255 | B2 * | 6/2009 | Torres et al. .................... 477/35 |
| 7,680,576 | B2 * | 3/2010 | Nagura et al. .................. 701/69 |
| 8,065,047 | B2 * | 11/2011 | Hasegawa et al. ............. 701/22 |
| 2007/0272456 | A1 | 11/2007 | Shiiba |

FOREIGN PATENT DOCUMENTS

| EP | 1 327 551 A2 | 7/2003 |
| JP | 03-070638 | 3/1991 |
| JP | 2000-274268 | 10/2000 |
| JP | 2003-201878 | 7/2003 |
| JP | 2008-007094 A | 1/2008 |

* cited by examiner

*Primary Examiner* — Dirk Wright
(74) *Attorney, Agent, or Firm* — Young Basile

(57) ABSTRACT

In order to attain a stable traction control regardless of an inertia change in a driving system, when a driving force transmitted from driving wheels to a road surface is lowered by a certain quantity by torque control, the driving force is lowered according to a transmission torque capacity of a clutch element for connecting and disconnecting a power source and the driving wheels.

18 Claims, 7 Drawing Sheets

FIG.6

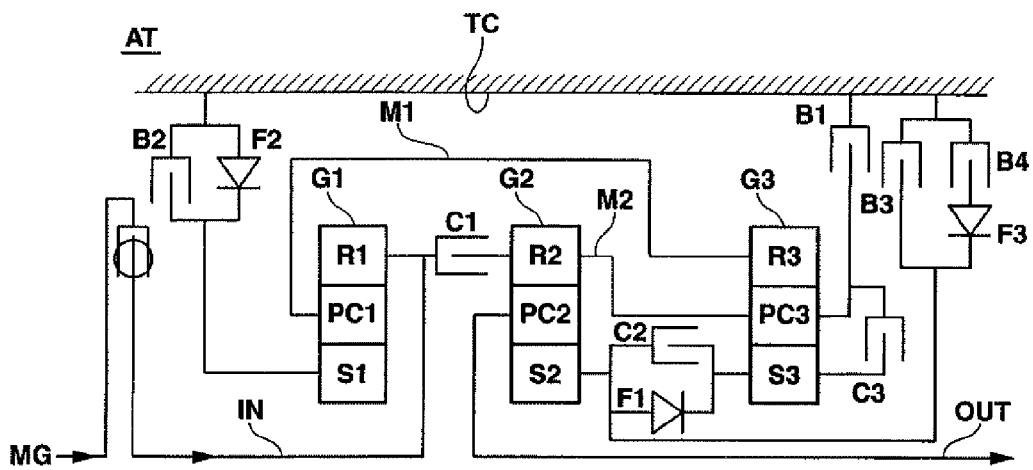

FIG.7

| | C1 | C2 | C3 | B1 | B2 | B3 | B4 | F1 | F2 | F3 |
|---|---|---|---|---|---|---|---|---|---|---|
| 1ST | | (○)* | | | ● | (○) | ○ | | △ | △ |
| 2ND | | | ○ | | (○) | (○) | ○ | | △ | △ |
| 3RD | | ○ | ○ | | (○) | | ● | C | △ | |
| 4TH | ○ | ○ | ○ | | | | ● | C | △ | |
| 5TH | ○ | ○ | | | ○ | | ● | C | C | |
| REV | | | ○ | ○ | | ○ | | | △ | △ |

△ : PARTICIPATING IN TORQUE TRANSMISSION DURING POWER-ON

C : CONTRIBUTING TO TORQUE TRANSMISSION DURING COASTING

● : NO ACTION FOR AFFECTING POWER OUTPUT WHILE HYDRAULIC PRESSURE APPLIED TO FRICTION ELEMENT (○) : ENGAGED IN OVERRUN MODE (○)* : ENGAGED DURING SELECTION AND THEREAFTER DISENGAGED IN OVERRUN MODE

○ : ENGAGED

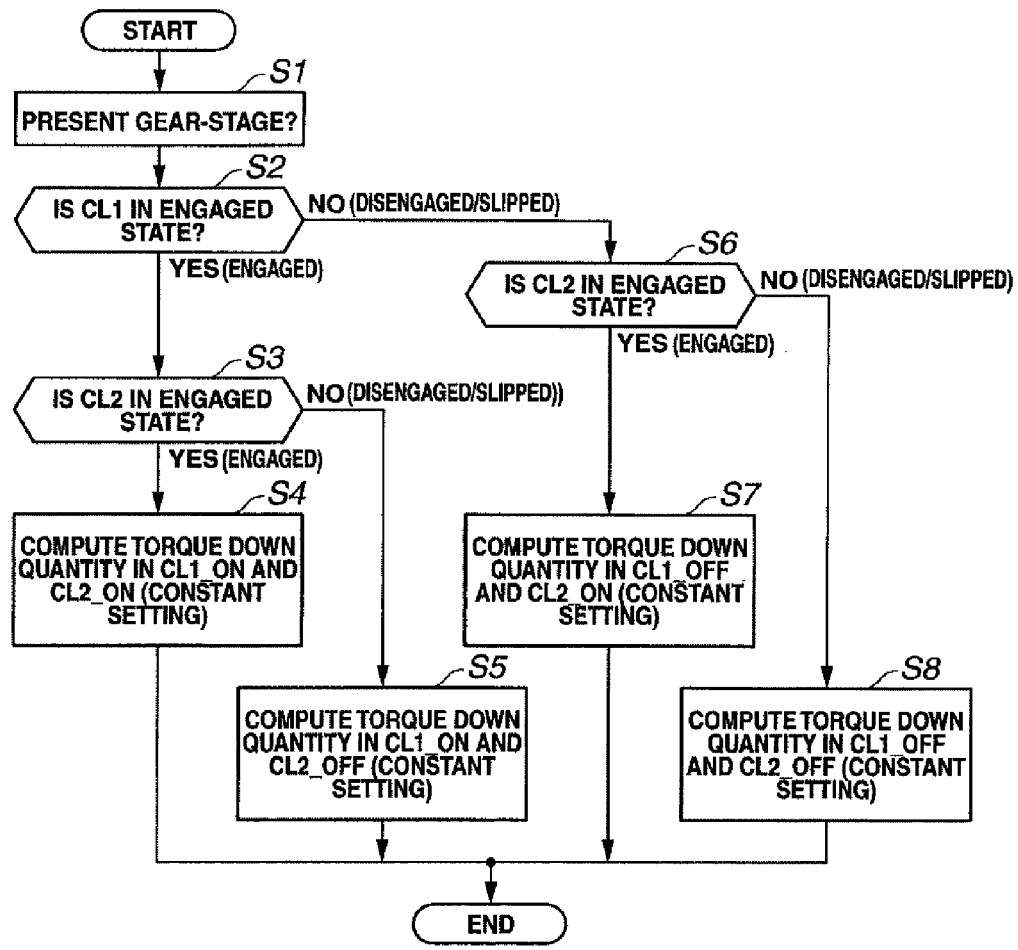

TRACTION CONTROL SYSTEM FOR VEHICLE

CROSS-REFERENCE TO RELATED APPLICATIONS

This application claims priority from Japanese Patent Application Serial Nos. 2008-051518, filed Mar. 3, 2008, and 2009-004254, filed Jan. 13, 2009, each of which is incorporated herein in its entirety by reference.

TECHNICAL FIELD

This invention relates generally to a traction control system for a vehicle that is arranged to lower a driving force transmitted from a driving wheel to road surface during an acceleration slip of the driving wheel.

BACKGROUND

Japanese patent provisional publication No. 2000-274268 discloses, as a traction control system for a vehicle, a technique in which a torque down is carried out by an engine and a motor generator when a slip of a driving wheel is detected during acceleration, thereby suppressing an acceleration slip.

BRIEF SUMMARY

Embodiments of the invention taught herein include a traction control system for driving wheels of a vehicle. One exemplary embodiment comprises a power source, a starting clutch having a variable transmission torque capacity and interposed between the power source and the driving wheels to connect and disconnect the power source and the driving wheels, a braking device associated with each of the driving wheels and capable of independently controlling a braking force to each wheel and a controller. According to one embodiment, the controller is configured to lower a driving force transmitted from the driving wheels to a road surface by controlling a driving torque of the power source and/or a braking force to the driving wheels when an acceleration slip in the driving wheels is above a certain value and to reduce a lowering quantity of the driving force as the variable transmission torque capacity of the starting clutch decreases. Details of this embodiment and others, including controllers for a traction control system and methods of controlling a traction control system, are described hereinafter.

BRIEF DESCRIPTION OF THE DRAWINGS

The description herein makes reference to the accompanying drawings wherein like reference numerals refer to like parts throughout the several views, and wherein:

FIG. 6 is a skeleton illustration showing a power train of an automatic transmission of the first embodiment;

FIG. 7 is a diagram showing an engagement operation diagram of clutches and brakes of FIG. 6;

FIG. 12 is a flowchart showing the traction control processing of FIG. 11; and

FIG. 13 is a diagram showing the relationship between engagement relation of clutches and each control gain and the relationship between gear-stages (for shift) and a control gain.

DETAILED DESCRIPTION OF EMBODIMENTS OF THE INVENTION

An inertia of a driving system changes according to an engaging state of a clutch element for accomplishing connection and disconnection between an engine or a motor generator as a power source and driving wheels. Accordingly, if the same torque down control is carried out regardless of the engagement state of the clutch element as described in Japanese patent provisional publication No. 2000-274268, an actual acceleration slip converging characteristics varies, thereby causing discomfort to a driver.

Embodiments of this invention are capable of achieving a stable traction control without being affected by an inertia change in a driving system. In brief, according to the invention, even if inertia of the driving system changes according to the transmission torque capacity of the clutch element, stable traction control can be achieved because a torque is lowered according to the transmission torque capacity of the clutch element. Hereinafter, embodiments of a traction control system for a vehicle according to the present invention are discussed with reference to drawings.

Figure 1:
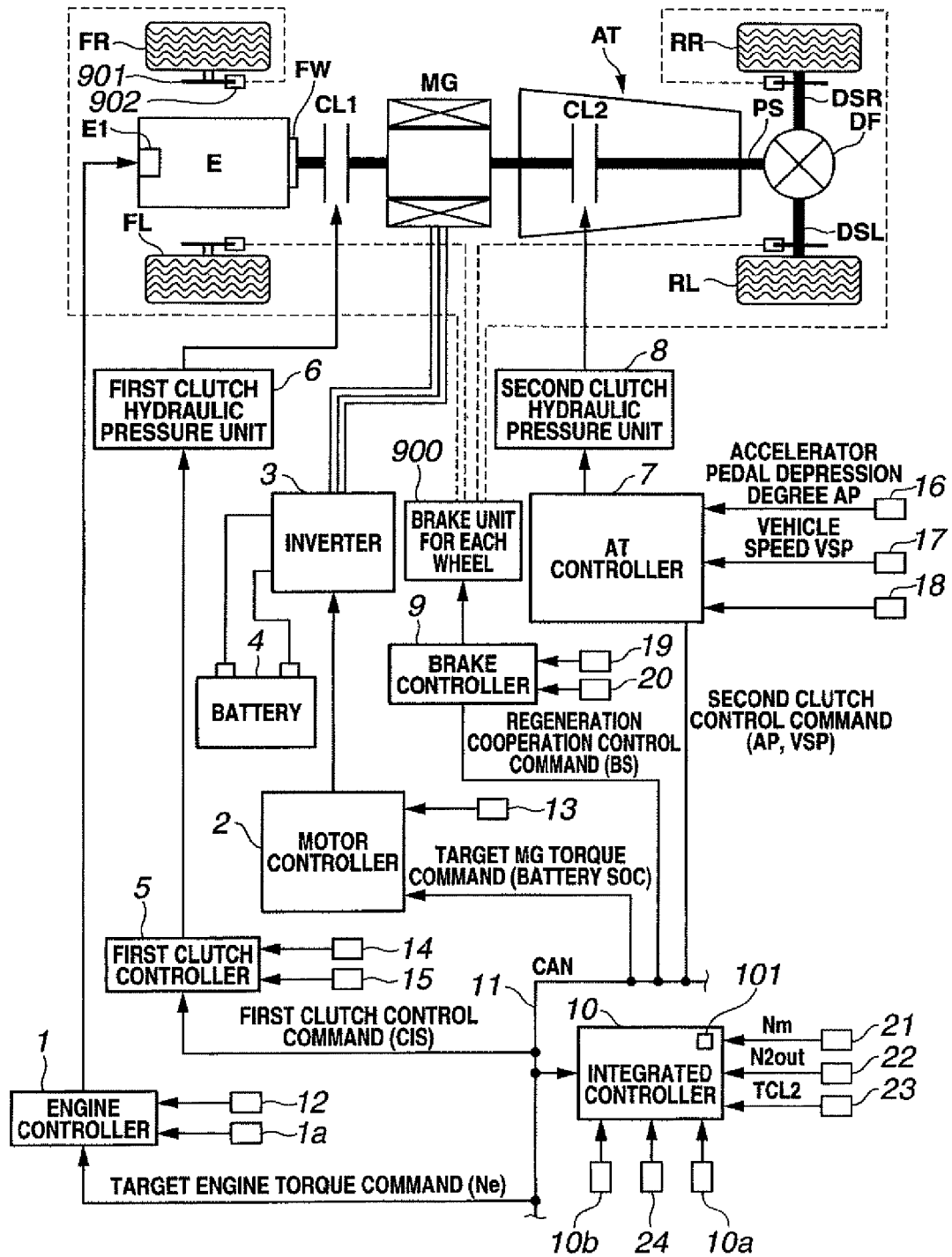
FIG. 1 is an illustration showing a rear-wheel driving hybrid vehicle incorporating a traction control system of a first embodiment.

First, an arrangement of a traction control system of a hybrid vehicle is discussed. As shown in FIG. 1, a driving system of the hybrid vehicle includes an engine E, a first clutch CL1 (engine clutch), a motor generator MG, a second clutch CL2 (starting clutch), an automatic transmission AT, a propeller shaft PS, a differential DF, a left drive shaft DSL, a right drive shaft DSR, a left rear wheel RL (driving wheel) and a right rear wheel RR (driving wheel). FL denotes a left front wheel, and FR denotes a right front wheel.

Engine E is, for example, a gasoline-fueled engine in which the valve position of a throttle valve and the like are controlled based on control commands from an engine controller 1. An engine power output shaft is provided with a flywheel FW.

First clutch CL1 is a clutch interposed between engine E and motor generator MG and serves as an engine clutch. The engagement and disengagement of the first clutch CL1 is controlled by a control hydraulic pressure produced by a first clutch hydraulic pressure unit 6 based on a control command from a first clutch controller 5.

Motor generator MG is a synchronous motor generator having a rotor in which a permanent magnet is embedded and a stator on which a stator coil is wound. The motor generator MG is controlled by being impressed with a three phase alternating current, which is produced by an inverter 3 based on a control command from a motor controller 2. This motor generator MG acts as an electric motor that rotates upon being supplied with electric power from a battery 4 (this condition is hereinafter refers to as "powering") and can also function as a generator to generate an electromotive force at opposite ends of the stator coil when the rotor is rotated by an external force to charge the battery 4 (this condition is hereinafter referred to as "regeneration"). The rotor of this motor generator MG is connected to a power input shaft of automotive transmission AT through a damper (not shown).

Second clutch CL2 is a clutch is interposed between motor generator MG and left and right rear wheels RL, RR and serves as a starting clutch. The engagement and disengagement, including a slip engagement, of the clutch are controlled by a control hydraulic pressure produced by a second clutch unit 8 based on a control command from an AT controller 7 as discussed hereinafter.

Automatic transmission AT is a transmission in which staged transmission ratios (gear ratios) such as forward five-speeds and reverse one-speed or the like are automatically changed according to a vehicle speed, an accelerator pedal depression degree and the like. Second clutch CL2 is not necessarily a separate clutch for exclusive use as the second clutch CL2. Instead, some friction clutch elements of a plurality of such elements to be engaged at each gear-stage (gear ratio) of automatic transmission AT may serve as the second clutch CL2.

The power output shaft of automatic transmission AT is connected to left and right rear wheels RL, RR through propeller shaft PS, differential DF, left drive shaft DSL and right drive shaft DSR. A multiplate wet clutch whose hydraulic fluid flow quantity and hydraulic pressure can be continuously controlled, for example, by a proportional solenoid is used as the first clutch CL1 and second clutch CL2.

This hybrid driving system has three drive modes according to the engaged and disengaged states of first clutch CL1 and second clutch CL2. A first drive mode is an electric drive mode (hereinafter referred to as "EV mode") in which drive is made using only the power of motor generator MG as a power source under the disengaged state of first clutch CL1. A second drive mode is an engine-using drive mode (hereinafter referred to as "HEY mode") in which drive is made by a power source including engine E upon the engaged state of first clutch CL1. A third drive mode is an engine-using slip drive mode (hereinafter referred to as "WSC mode") in which drive is made by a power source including engine E upon making a slip control of second clutch CL2 in the engaged state of first clutch CL1. This mode can accomplish a creep drive particularly when a battery SOC is low or when an engine coolant temperature is low. When transition is made from the EV mode to the HEV mode, first clutch CL1 is engaged to allow starting of the engine E by using the torque of motor generator MG.

Additionally, where an accelerator hill hold is made on an ascending slope having a road inclination greater than a certain value so as to maintain a vehicle stopping condition upon adjustment of an accelerator pedal by a driver, there is a fear that a condition in which the slip quantity of second clutch CL2 is excessively large is continued in the WSC mode. This is because the engine speed of engine E cannot be lower than an idling speed. In this regard, the first embodiment is further provided with a motor slip drive mode (hereinafter referred to as "MWSC" mode). In MWSC mode, first clutch CL1 is disengaged while engine E is operated, and the slip control is made in second clutch CL2 while motor generator MG is operated, so that drive is made by motor generator MG as a power source.

The HEV mode further includes three drive modes such as an engine drive mode, a motor assist drive mode and a drive power generation mode.

In the engine drive mode, the driving wheels are driven by using only engine E as a power source. In the motor assist drive mode, the driving wheels are driven by using engine E and motor generator MG as power sources. In the drive power generation mode, the driving wheels RR, RL are driven by using engine E as a power source while motor generator MG is simultaneously caused to function as an electric generator to charge the battery 4.

During steady speed driving and accelerated speed driving, motor generator MG is operated as an electric generator by using the power of engine E to charge the battery 4. Additionally, during decelerated speed driving, braking energy is regenerated so as to make electric generation by motor generator MG, thereby being used for charging battery 4. Finally, electric power generation mode occurs when motor generator MG is operated as an electric generator while stopping the vehicle.

A brake disc 901 and a hydraulic brake actuator 902 are disposed on each of four wheels RL, RR, FL, FR. Additionally, a brake unit 900 is provided corresponding to the four wheels. Each brake unit 900 is arranged to supply hydraulic pressure to each brake actuator 902, thereby developing a braking force.

As shown in FIG. 1, a control system of the hybrid vehicle is arranged including engine controller 1, motor controller 2, inverter 3, battery 4, first clutch controller 5, first clutch hydraulic pressure unit 6, AT controller 7, second clutch hydraulic pressure unit 8, brake controller 9 and integrated controller 10. Engine controller 1, motor controller 2, first clutch controller 5, AT controller 7, brake controller 9 and integrated controller 10 are connected with each other through a CAN communication line 11, which makes information exchange possible among them.

Engine speed information from engine speed sensor 12 is input to engine controller 1, which outputs a command for controlling an engine operating point (Ne: engine speed, Te: engine torque) to, for example, a throttle valve actuator E1 in accordance with a target engine torque command and the like from integrated controller 10.

Here, engine controller 1 may output the command to, for example, a variable valve timing actuator that is capable of changing valve timing at an intake side or an exhaust side, a valve lift amount variable actuator that is capable of changing a valve lift amount of a valve, an injector used for fuel injection, a plug spark timing changing actuator, and the like, in addition to throttle valve actuator E1. Information such as engine speed Ne and the like are supplied through CAN communication line 11 to integrated controller 10.

Information from a resolver 13 that detects the rotational position of a rotor of motor generator MG is input to motor controller 2, which outputs to inverter 3 a command for controlling the motor operating point (Nm: motor generator rotational speed, Tm: motor generator torque) of motor generator MG according to a target motor generator torque command and the like from integrated controller 10. This motor controller 2 monitors a state of charge SOC of battery 4. The SOC is used as control information for motor generator MG and is supplied to integrated controller 10 through CAN communication line 11.

Sensor information from first clutch hydraulic pressure sensor 14 and first clutch stroke sensor 15 are input to first clutch controller 5, which outputs a command for controlling the engagement and disengagement of first clutch CL1 according to a first clutch control command from integrated controller 10 to first clutch hydraulic pressure unit 6. The information of a first clutch stroke CIS is supplied to integrated controller 10 through CAN communication line 11.

Sensor information from an inhibitor switch for outputting a signal according to the signals of accelerator position sensor 16, vehicle speed sensor 17, second clutch hydraulic pressure sensor 18 and the signal according to a shift lever operated by a driver is input to AT controller. The AT controller outputs a command for controlling the engagement and disengagement of second clutch CL2 according to the second clutch control command from integrated controller 10 to second clutch hydraulic pressure unit 8 in an AT hydraulic pressure control valve. An accelerator pedal depression degree APO, a vehicle speed VSP and the information of the inhibitor switch are supplied to integrated controller 10 through CAN communication line 11.

Brake controller 9 outputs a command for controlling brake actuators 902 of the four wheels to respective brake units 900 of the four wheels, thereby controlling the braking force of each of the four wheels. Sensor information from the wheel speed sensor 19 for detecting the wheel speed of each of the four wheels and brake stroke sensor 20 are input to brake controller 9. When a required braking force obtained according to a brake stroke BS is insufficient with only the regeneration braking force during braking by depressing a brake pedal, regeneration cooperation brake control is made according to a regeneration cooperation control command from integrated controller 10 in order to compensate for the insufficient amount with a mechanical braking force (braking force due to friction brake).

Integrated controller 10 controls the consumed energy of the whole vehicle and functions to drive the vehicle with the highest efficiency. To the integrated controller, information from a motor rotational speed sensor 21 for detecting a motor rotational speed Nm, a second clutch output rotational speed sensor 22 for detecting a second clutch output rotational speed N2out, a second clutch torque sensor 23 for detecting a second clutch transmission torque capacity TCL2, a brake hydraulic pressure sensor 24, a temperature sensor 10a for detecting the temperature of second clutch CL2, information from an acceleration sensor (G sensor) 10b for detecting forward and backward acceleration and information obtained through CAN communication line 11 are input.

Additionally, integrated controller 10 accomplishes operation control of engine E by the control command to engine controller 1, operation control of motor generator MG by the control command to motor controller 2, engagement and disengagement control of first clutch CL1 by the control command to first clutch controller 5, and engagement and disengagement control of second clutch CL2 by the control command to AT controller 7.

The controllers 10, 1, 2, 5 and 7 are implemented by, for example, conventional engine control units such as is known in the art. Each can thus be a microcomputer including a random access memory (RAM), a read-only memory (ROM) and a central processing unit (CPU), along with various input and output connections. Generally, the control functions and/or sections described herein and associated with the respective controllers (such as the sections of integrated controller 10 as described with respect to FIG. 2 hereinafter) are performed by execution by the CPU of one or more software programs stored in ROM. Of course, some or all of the functions can be implemented by hardware components. Moreover, although several controllers are shown, the functions can be combined into a single controller.

Integrated controller 10 includes a traction control section 101 (torque controlling means) for carrying out so-called traction control. Specifically, this traction control section 101 detects whether an acceleration slip is generated in the driving wheels or not based on the wheel speeds of left and right rear wheels RL, RR as driving wheels from wheel speed sensor 19. When the acceleration slip is generated, the driving force transmitted from left and right rear wheels RL, RR to the road surface is lowered by a certain quantity so as to suppress the acceleration slip.

In order to lower the driving force transmitted from the left and right rear wheels RL, RR to the road surface, lowering the torques of engine E and motor generator MG as the power sources is carried out. Additionally, adding a braking force to the left and right rear wheels by operating a brake actuator 902 is carried out. In this traction control section 101, a power source side torque down quantity (executed by engine E and motor generator MG) is computed based on the relationship between the acceleration slip quantity and a power source side control threshold value. Additionally, a brake side torque down quantity (executed by brake unit 900) is computed based on the relationship between the acceleration slip quantity and a brake side control threshold value.

Specifically, a computation is made in such a manner that the acceleration slip quantity falls within a certain range in the relationship to each control threshold value by a wheel speed feedback control configuration. At this time, a feedback control gain is set according to a gear-stage information of automatic transmission AT and the engaging state of first and second clutches CL1, CL2, thereby carrying out computation of the torque down quantity. The detail of this control is discussed hereinafter.

A command for lowering the driving torque according to the power source side torque down quantity is output to engine controller 1 and motor controller 2. Simultaneously, a command for providing a braking torque according to the brake side torque down quantity is output to brake controller 9.

Figure 2:
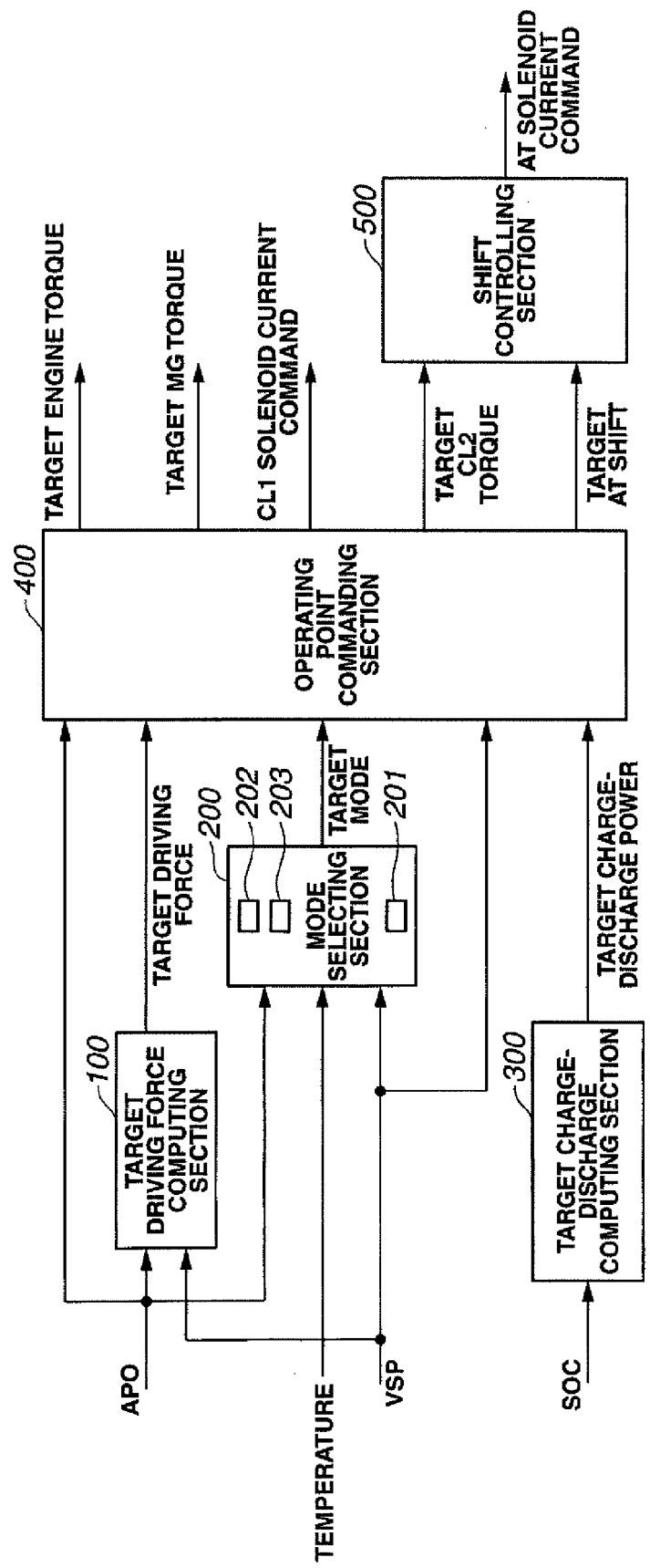
FIG. 2 is a control block diagram showing a computing program in an integrated controller in the first embodiment.

Hereinafter, a control computed by integrated controller 10 of the first embodiment is discussed with reference to a block diagram shown in FIG. 2. For example, this computation is carried out every 10 msec control period by integrated controller 10. Integrated controller 10 includes a target driving force computing section 100, a mode selecting section 200, a target charge-discharge computing section 300, an operating point commanding section 400 and a shift controlling section 500.

Figure 3:
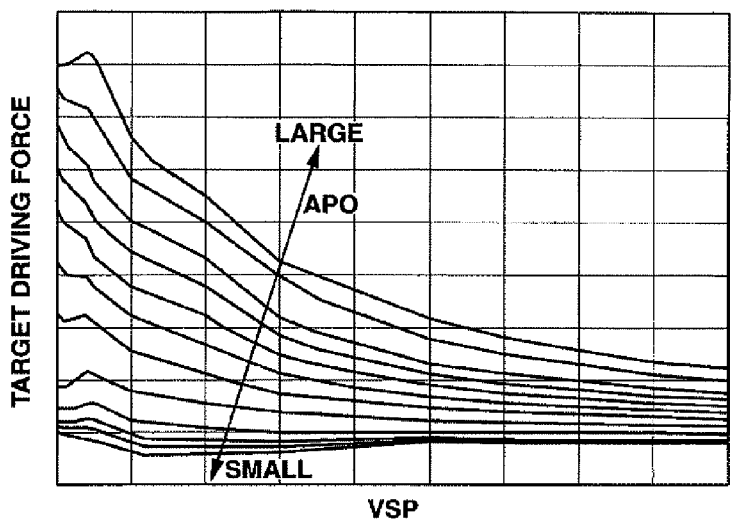
FIG. 3 is a diagram showing an example of a target driving force map used for a target driving force computation in a target driving force computing section in FIG. 2.

In target driving force computing section 100, a target driving force tFoO is computed according to accelerator pedal depression degree APO and vehicle speed VSP by using a target driving force map such as that shown in FIG. 3.

Figure 5:
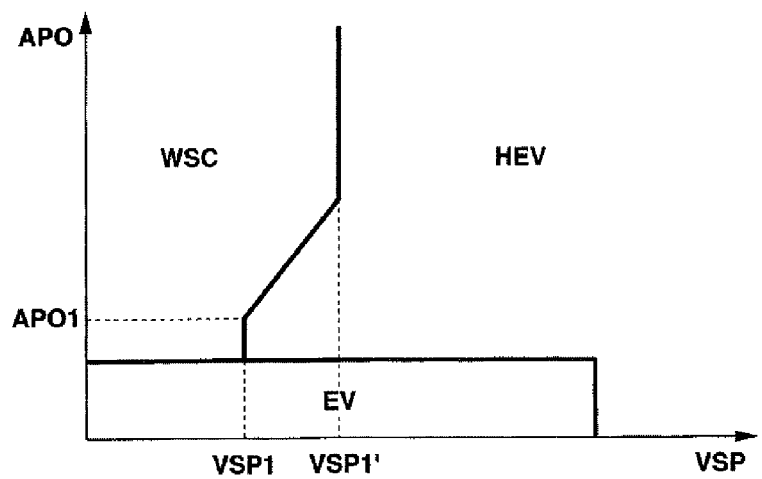
FIG. 5 is a diagram showing a normal mode map used for selecting a target mode in a mode selecting section in FIG. 2.

In mode selecting section 200, a drive mode is selected based on the vehicle speed and accelerator pedal depression degree APO by using a mode map such as the normal mode map shown in FIG. 5. The normal mode map contains therein the EV mode, the WSC mode and the HEV mode, in which a target mode is computed according to accelerator pedal depression degree APO and vehicle speed VSP. However, even where the EV mode is selected, the HEV mode or the WSC mode are compulsorily employed as the target mode if battery SOC is not higher than a certain value. Additionally, in mode selecting section 200, the MWSC mode is selected in place of the WSC mode when an estimated road inclination is greater than a certain value upon estimation of a road inclination of an ascending slope or the like.

In the normal mode map of FIG. 5, a changeover line HEV→WSC is set in a region lower than a lower limit value vehicle speed VSP1 at which the engine speed is lower than the idling speed of engine E when automatic transmission AT is in first speed stage (gear-stage) and in a region smaller than the certain accelerator depression degree APO1. In a region greater than the certain accelerator depression degree APO1, a larger driving force is required, and therefore the WSC mode is set also in a high vehicle speed VSP1' region higher than the lower limit vehicle speed VSP1. When the EV mode cannot be accomplished because the battery SOC is lower, the WSC mode is selected even during vehicle starting or the like in the configuration.

When the accelerator pedal depression degree APO is larger, the engine torque corresponding to the engine speed near the idling speed and the torque of motor generator MG have difficulty meeting the torque requirements for mode switching. Here, concerning engine torque, more torque can be outputted as the engine speed rises. From this, if more torque is outputted by raising the engine speed, transition from the WSC mode to the HEV mode can be accomplished within a short period of time even if the WSC mode is carried out in a vehicle speed region reaching to a vehicle speed higher than the lower limit vehicle speed VSP1. This case corresponds to a WSC region extending to the lower limit vehicle speed VSP1' as shown in FIG. 5.

Figure 4:
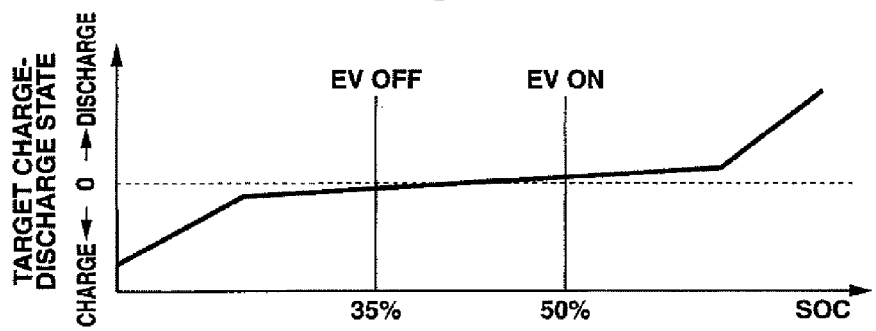
FIG. 4 is a diagram showing an example of a target charge-discharge quantity map used for a computation of a target charge-discharge power in a target charge-discharge computing section in FIG. 2.

In target charge-discharge computing section 300, a target charge-discharge power tP is computed from battery SOC by using a target charge-discharge quantity map such as shown in FIG. 4.

When SOC≧50%, the EV mode region is present in the normal mode map as shown in FIG. 5. If the EV mode region once appears in the mode map, this region continues to appear until SOC lowers below 35%.

When SOC<35%, the EV mode region is absent from the normal mode map of FIG. 5. If the EV mode region is absent from the normal mode map, this region continues to be absent until SOC reaches 50%.

In operating point commanding section 400, a transitional target engine torque, a target motor generator torque, a target second clutch transmission torque capacity, a target gear-stage of automatic transmission AT and a first clutch solenoid current command are computed as operating point targets from acceleration pedal depression degree APO, target driving force tFoO, the target mode, vehicle speed VSP and target charge-discharge power tP. Additionally, operating point commanding section 400 is provided with an engine starting controlling section for starting engine E when the transition from the EV mode to the HEV mode is made.

Shift controlling section 500 drivingly controls solenoid valves in automatic transmission AT to attain the target second clutch transmission torque capacity and the target gear-stage along a shift schedule. The target gear-stage has been previously set based on vehicle speed VSP and acceleration pedal depression degree APO.

Next, the detail of the WSC mode is discussed. The WSC mode maintains a condition where engine E is operated in which a response to a required driving force change is high. Specifically, first clutch CL1 is completely engaged, and second clutch CL2 is slip-controlled with a transmission torque capacity TCL2 according to a required driving force so as to make driving by using the driving forces of engine E and/or motor generator MG.

In the hybrid vehicle of the first embodiment, the vehicle speed is decided according the engine speed of engine E when first clutch CL1 and second clutch CL2 are completely engaged because an element for absorbing a rotational difference, such as a torque converter, is not included. The engine is operated according to a lower limit value corresponding to an idling speed, which is a rotational speed required to maintain independent rotation of the engine E. Concerning this idling speed, if engine E performs an idling-up operation where the idling speed is increased to perform a warming-up operation or the like, the lower limit value is further raised. Additionally, a smooth transition to the HEV mode cannot be made when a required driving force is high. Here, "complete engagement" represents a condition where no slip (rotational difference) is produced in the clutch. Specifically, the complete engagement is realized by setting the transmission torque capacity of the clutch at a value sufficiently larger than a torque to be transmitted at that time.

In the EV drive mode, because the first clutch CL1 is disengaged, the driving force is not limited by the lower limit value to operation at the idling speed. However, the engine E may have to produce a stable torque when driving in the EV mode due to a low state of charge SOC of the battery 4, preventing a required driving force from being attained only with motor generator MG.

Accordingly, in a low vehicle speed region lower than the vehicle speed corresponding to the above-mentioned lower limit value and additionally in the case that driving in the EV mode is difficult based on battery SOC and in the region where a required driving force cannot be attained only with motor generator MG, the engine speed is maintained at a certain engine speed, and second clutch CL2 is slip-controlled so as to select the WSC mode in which driving is made by using the engine torque.

Next, the MWSC mode is discussed. Where an estimated inclination is larger than a certain inclination level, a larger driving force is required as compared with that required on a flat road if the vehicle is intended to be maintained at a stopping condition or at a slight speed starting condition without carrying out a brake pedal operation. This is because a counteraction against a load of the vehicle itself is necessary.

From the viewpoint of avoiding heat generation due to slipping of second clutch CL2, it could be possible to select the EV mode when there is a sufficient state of charge SOC of the battery 4. However, selecting EV mode under such conditions causes other problems as follows. When the transition from the EV mode to the WSC mode is required, the engine E must be started because the engine E stops in EV mode. So the motor generator MG must secure a surplus torque to start the engine E during driving the vehicle, thereby unnecessarily lowering the driving torque upper limit value.

Additionally, when only a torque is outputted to motor generator MG in the EV mode so as to stop or extremely lower the rotation of motor generator MG, a lock current flows (phenomena where electric current continues to flow to one element) to a switching element of the inverter 3, which can possibly degrade the durability of the inverter 3.

Additionally, in a region lower than lower limit vehicle speed VSP1 corresponding to the idling speed of engine E in the first speed (first gear), the engine speed of engine E itself cannot be lowered below the idling speed. At this time, when the WSC mode is selected, the slip quantity of second clutch CL2 becomes large so that the durability of second clutch CL2 can be degraded.

A large driving force is required on an inclined road as compared on a flat road, and therefore the transmission torque capacity required by second clutch CL2 becomes high. Continuing a condition of a large slip quantity at high torque tends to degrade the durability of second clutch CL2. Further, since the vehicle speed gradually rises, time is required for the transition to the HEV mode, thereby causing a further heat generation.

In view of the problems above, a setting is made for the MWSC mode in which the rotational speed of motor generator MG is feedback-controlled at a target rotational speed that is greater by a certain rotational speed than the output rotational speed of second clutch CL1 upon disengaging first clutch CL1 while engine E is operated. This controls the transmission torque capacity of second clutch CL2 at a driving force required by the driver.

In other words, second clutch CL2 is slip-controlled while motor generator MG is put into a rotational state in which the rotational speed thereof is made lower than the idling speed. Simultaneously, the control for engine E is changed into a feedback control in which the idling speed is the target engine speed. In the WSC mode, the engine speed is maintained under a rotational speed feedback control of motor generator MG. As a result, when first clutch CL1 is disengaged, the engine speed cannot be controlled at the idling speed by motor generator MG. Accordingly, engine speed feedback control is carried out by engine E itself.

As shown in FIG. 6, automatic transmission AT includes three sets of simple planetary gears. Front planetary gear G1 has a front sun gear S1, a front carrier PC1 and a front ring gear R1 as rotational elements, mid planetary gear G2 has a mid sun gear S2, a mid carrier PC2 and a mid ring gear R2 as rotational elements, and rear planetary gear G3 has a rear sun gear S3, a rear carrier PC3 and a rear ring gear R3 as rotational elements.

In FIG. 6, IN denotes an input shaft to which a rotational driving torque is inputted through a damper from only motor generator MG or from engine E and motor generator MG. OUT denotes an output shaft that outputs the rotational driving torque to left and right wheels RL, RR via automatic transmission AT.

The automatic transmission AT is provided with clutch elements for deciding the forward five-speed and reverse one-speed as shown in FIG. 7. The clutch elements include an input clutch C1, a high and low reverse clutch C2, a direct clutch C3, a reverse brake B1, a front brake B2, a low coast brake B3, a forward brake B4, a first one-way clutch F1, a third one-way clutch F2 and a forward one-way clutch F3.

Input clutch C1 is adapted to connect front ring gear R1 to input shaft IN when disengaged, and to connect front ring gear R1 and mid ring gear R2 to input shaft IN when engaged. High and low reverse clutch C2 is adapted to connect mid sun gear S2 and rear sun gear S3 when engaged. Direct clutch C3 is adapted to connect rear sun gear S3 and rear carrier PC3 when engaged.

Reverse brake B1 is adapted to fix rear carrier PC3 to a transmission case TC when engaged. Front brake B2 is adapted to fix front sun gear S1 to transmission case TC when engaged. Low coast brake B3 is adapted to fix mid sun gear S2 to transmission case TC when engaged. Forward brake B4 is adapted to fix mid sun gear S2 to transmission case TC when engaged.

First one-way clutch F1 is adapted to allow rear sun gear S3 to freely rotate in a right direction (the same rotational direction as that of the engine) and to fix a reverse direction rotation of the rear sun gear S3 relative to mid sun gear S2. Third one-way clutch F2 is adapted to allow front sun gear S1 to freely rotate in a right direction and to fix a reverse direction rotation of the front sun gear S1. Forward one-way clutch F3 is adapted to allow mid sun gear S2 to freely rotate in a right direction and to fix a reverse direction rotation of the mid sun gear S2.

Output shaft OUT is directly connected to mid carrier PC2. Front carrier PC1 and rear ring gear R3 are directly connected to each other by a first member M1. Mid ring gear R2 and rear carrier PC3 are directly connected with each other by a second member M2.

Figure 8:
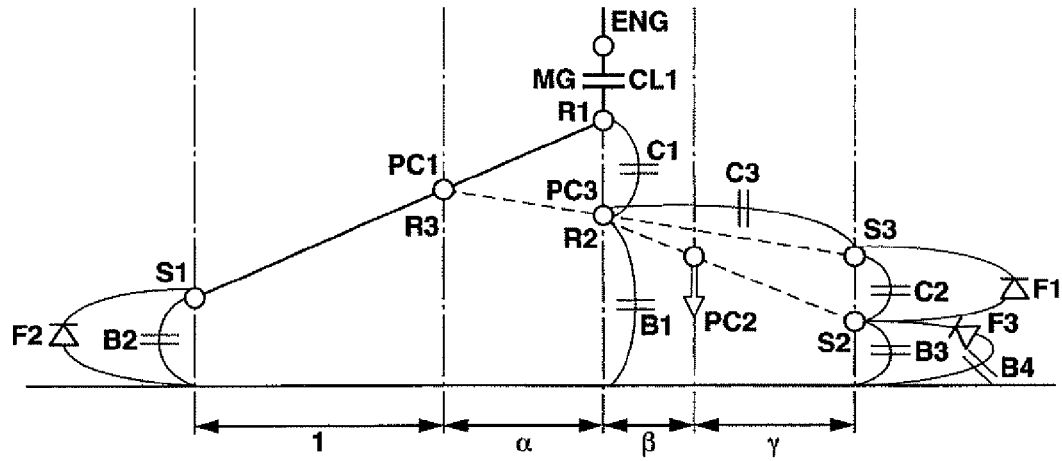
FIG. 8 is a collinear diagram showing the relationship among rotational elements of the automatic transmission of FIG. 6.

FIG. 8 is a collinear diagram showing the relationship among rotational elements of automatic transmission AT. More specifically, the collinear diagram shows the relationship among the rotational numbers (rotational speeds) of respective rotational elements, in which the respective rotational elements are located at positions apart from each other by gear ratios decided by the planetary gear. On the assumption that the gear ratio between front sun gear S1 and front carrier PC1 (rear ring gear R3) is 1, the gear ratio between front carrier PC1 and front ring gear R1 (rear carrier PC3, mid ring gear R2) is $\alpha$, the gear ratio between front ring gear R1 and mid carrier PC2 is $\beta$, and the gear ratio between mid carrier PC2 and mid sun gear S2 (rear sun gear S3) is $\gamma$.

Figure 9:
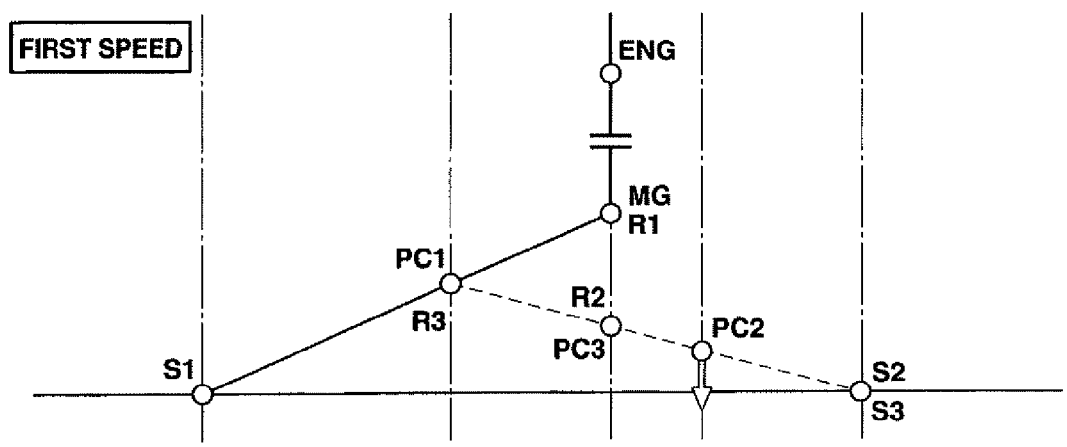
FIG. 9 is a collinear diagram at a time achieving a first speed in the hybrid vehicle of the first embodiment.
Figure 10:
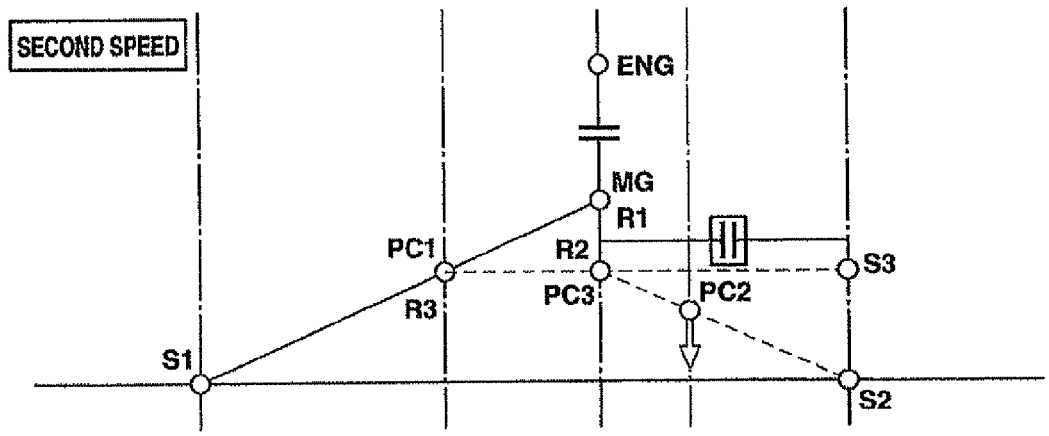
FIG. 10 is a collinear diagram at a time achieving a second speed in the hybrid vehicle of the first embodiment.

FIG. 9 is a collinear diagram at a time achieving a first speed (gear), and FIG. 10 is a collinear diagram at a time achieving a second speed (gear). For reference, only the first and second speeds are discussed with reference to drawings. Regarding other gear-stages, each gear-stage can be suitably attained according to the engagement relationships shown in the engagement operation diagram of FIG. 7.

In automatic transmission AT, as shown in the engagement operation diagram of FIG. 7 and the collinear diagram of FIG. 9, the first speed is attained by engaging high and low reverse clutch C2, front brake B2, low coast brake B3 and forward brake B4. As shown in the engagement operation diagram of FIG. 7 and the collinear diagram of FIG. 10, the second speed is attained by engaging direct clutch C3, front brake B2, low coast brake B3 and forward brake B4.

Comparing the collinear diagram of the first speed (FIG. 9) and the collinear diagram of the second speed (see FIG. 10), the difference is that rear sun gear S3 is fixed in the first speed, whereas rear sun gear S3 rotates together with rear planetary gear G3 as a one-piece upon engagement of direct clutch C3 in the second speed. In other words, rotational members participating in transmitting drive torque vary according to the gear-stages. This means that inertia of the driving system present during rotation varies. In the automatic transmission of the first embodiment, inertia present during rotation varies in other gear-stages; however, inertia present during rotation is the same in third and fifth speeds.

Figure 11:
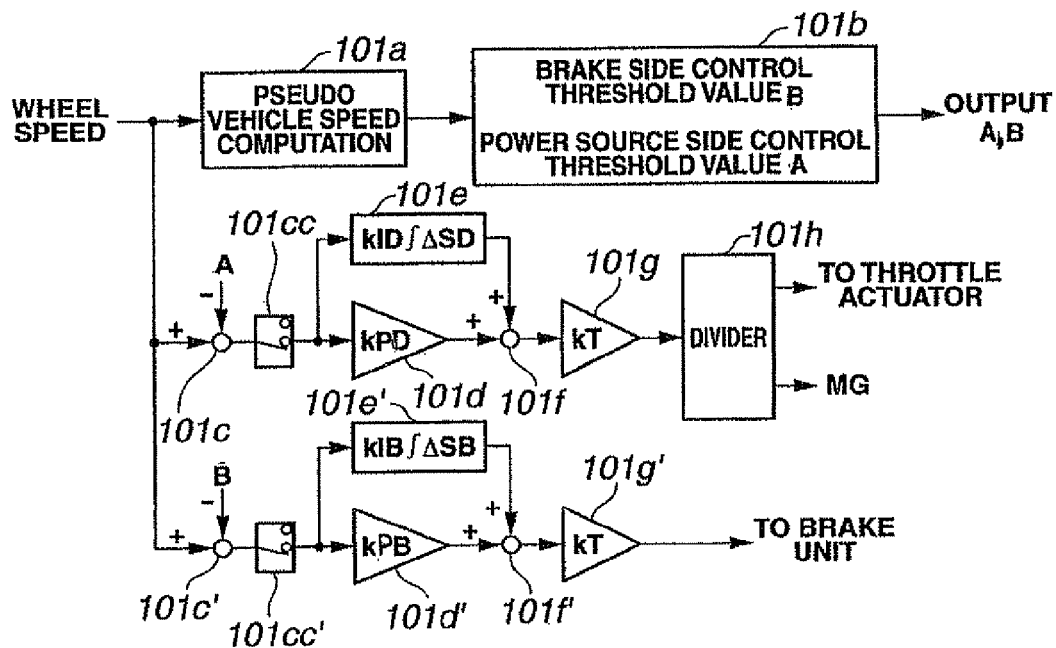
FIG. 11 is a control block diagram showing a traction control processing of the first embodiment.

Next, traction control processing executed by traction control section 101 in integrated controller 10 is discussed with reference to FIG. 11. In traction control section 101, generation of slip in the driving wheel is judged by comparing a speed of a vehicle body computed by simulations and the wheel speed of the driving wheel. Then, when slip is generated in the driving wheel, a command of torque down is fed to engine E and motor generator MG as power sources. Additionally, a command for applying a braking force is fed to brake unit 900 of the driving wheel as a braking device. Together, these actions lower the driving force of the driving wheel.

In a pseudo vehicle body speed computing section 101a, a pseudo vehicle body speed is computed based on the wheel speed data of the four wheels detected by the wheel speed sensors 19. This computed speed may be, for example, select-low of the four wheels or a vehicle speed mean value of a front wheel as a follower wheel.

In a control threshold value computing section 101b, power source side control threshold value A and brake side control threshold value B are computed based on the computed pseudo vehicle body speed. Specifically, a value obtained by adding a certain value to the pseudo vehicle body speed is rendered as power source side control threshold value A, whereas a value obtained by adding a further large value is rendered as brake side control threshold value B. The value A and the value B may be the same, and therefore they are not particularly limited.

In a power source side deviation computing section 101c, a deviation $\Delta SD$ between the wheel speed of the driving wheel and power source side control threshold value A is computed. In a deviation outputting section 101cc, judgment is made as to whether deviation $\Delta SD$ is positive or not. When $\Delta SD$ is positive, ΔSD is outputted as is. When ΔSD is negative, ΔSD=0 is output. Accordingly, in the traction control, only when this deviation ΔSD is positive is the judgment of generation of an acceleration slip in the driving wheel made so as to execute the traction control.

Similarly, in a brake side deviation computing section 101c', a deviation ΔSB between the wheel speed of the driving wheel and brake side control threshold value B is computed. In a deviation outputting section 101cc', judgment is made as to whether deviation ΔSB is positive or not. When ΔSB is positive, ΔSB is outputted as is. When ΔSB is negative, ΔSB=0 is output. Making the judgment of generation of an acceleration slip in the driving wheel only when this deviation ΔSB is positive is similar to the above.

In a power source side proportion computing section 101d, a certain power source side proportional gain kPD is accumulated on ΔSD, thereby computing a proportional control quantity. Similarly, in a brake side proportion computing section 101d', a certain brake side proportional gain kPB is accumulated on ΔSB, thereby computing a proportional control quantity.

In a power source side integration computing section 101e, ΔSD is integrated while a certain power source side integral gain kID is accumulated, thereby computing an integral control quantity. Similarly, in a brake side integration computing section 101e', ΔSB is integrated while a certain brake side integral gain kIB is accumulated, thereby computing an integral control quantity.

In a control quantity adding section 101f, the proportional control quantity and the integral control quantity developed using power source side control threshold value A are added. In a gear-stage corresponding section 101g, a gain kT corresponding to inertia in each gear-stage of automatic transmission AT is accumulated on the added control quantities and is output to a divider 101h.

In divider 101h, torque down quantities are distributed to the engine E and motor generator MG according to their operating conditions. Then, a throttle actuator E1 (see FIG. 1) and motor generator MG output torque down commands according to the distributed torque down quantities.

In a control quantity adding section 101f', the proportional control quantity and the integral control quantity developed using brake side control threshold value B are added. In a gear-stage corresponding section 101g', a gain kT corresponding to the inertia in each gear-stage of automatic transmission AT is accumulated on the added control quantities, and a torque down command is output to a brake actuator 902 (see FIG. 1).

FIG. 13 shows the relationship between engagement relationship of clutches CL1, CL2 and each control gain kPD, kPB, kID, kIB, and the relationship between gear-stages (first through fifth) and control gain kT. Namely, each of the gains kPD, kPB, kID, kIB is set as shown in FIG. 13 according to ON and OFF states of first and second clutches CL1, CL2. These gains kPD, kPB, kID, kIB are set to synchronize the operation of an actuator that is the slowest in response speed in a plurality of actuators with the operations of other actuators.

For example, when a torque down is carried out by the operation of throttle actuator E1 and by the operation of brake actuator 902, control gains kPB, kIB by brake actuator 902 are set smaller than control gains kPD, kID on the power source side in case that a torque down response by throttle actuator E1 is slow while a torque down response by brake actuator 902 is fast. By this, the phases of the torque down controls accomplished by both actuators can coincide with each other, thereby achieving a torque down without discomfort to the driver.

Additionally, control gain kT is set at a value corresponding to the inertia of each gear-stage of automatic transmission AT since the inertia varies according to the gear-stages as discussed with respect to FIGS. 9 and 10.

Here, the reason why the control gain is changed according to the engaging state of each clutch and the gear-stage of automatic transmission AT is next discussed. A dynamic equation of a power transmission system (hereinafter referred to as power train) including the power source (engine E/motor generator MG) is represented by the following equation:

$$T\text{out} = I\text{out} \times d\omega\text{out}/dt; \text{ wherein}$$

Tout is an output torque of the power train, i.e., a torque output to left and right drive shafts DSL, DSR;
Iout is an inertia of the power train; and
dωout/dt is a rotational angular acceleration of left or right drive shafts of the power train.

The object of the traction control is to suppress the acceleration slip within a certain range. In other words, it is necessary to obtain a desired rotational angular acceleration. Accordingly, in order to obtain the required rotational angular acceleration, the above equation becomes the following equation upon being rearranged with dωout/dt:

$$d\omega\text{out}/dt = T\text{out}/I\text{out}$$

That is, in order to obtain a required rotational angular acceleration, when inertia Iout becomes small, a required torque down quantity can be sufficient even if small. To the contrary, if output torque Tout is the same, the rotational angular acceleration becomes large. In other words, if the torque down quantity is not changed according to inertia Iout, the torque down characteristics of the traction control are affected according to inertia Iout, thereby providing discomfort to a driver.

In view of the above, in the first embodiment, the control gain during the traction control is changed according to the inertia of the power train. Specifically, concerning the power source side proportional gains kPD1-kPD4, the inertia of the power train is the largest when both first clutch CL1 and second clutch CL2 are ON, and therefore the power source side proportional gain KPD1 at this time is set to be the largest. Additionally, where second clutch CL2 is OFF (slip-engaged as discussed after), no contribution is made by the magnitude of the inertia on the side of motor generator MG relative to this second clutch CL2, and therefore the power source side proportional gains kPD2, kPD4 are set at the minimum values regardless of the ON/OFF state of first clutch CL1. This is similar for brake side proportional gains kPB1-kPB4, power source side integral gains kID1 to kID4 and brake side integral gains kIB1-kIB4.

In a state where second clutch CL2 is slip-engaged (the WSC mode), the driving torque transmitted to the driving wheel cannot exceed the transmission torque capacity of second clutch CL2. Accordingly, when traction control is operated in this state, the torque on the power source side should be made smaller than the transmission torque capacity of second clutch CL2 in order to lower the output torque of the power train by the torque down on the power source side. By doing so, the slip condition of second clutch CL2 is cancelled, thereby providing the fear of inviting an engaging shock or the like. Accordingly, at this time, the control gain on the power source side is rendered 0 while the control gain on the brake side is enlarged, thereby accomplishing a torque down by brake actuator 902.

FIG. 12 is a flowchart showing the traction control processing. Disengagement of second clutch CL2 means a state where second clutch CL2 is basically slip-engaged. This is because, in a state where second clutch CL2 is completely disengaged, no acceleration slip is generated in the driving wheel.

At step S1, the present gear-stage in automatic transmission AT is confirmed. This confirmation is made to grasp a suitable inertia since the rotational members are different according to the gear-stages as discussed above. Then, a control gain kT according to the selected gear-stage is selected as shown in FIG. 13.

At step S2, judgment is made as to whether first clutch CL1 is in a completely engaged state. When the clutch CL1 is in the completely engaged state, control goes to step S3. When the clutch is in other states (disengaged or slip-engaged), control goes to step S6.

At step S3, judgment is made as to whether second clutch CL2 is in a completely engaged state or not. When the clutch CL2 is in the completely engaged state, control goes to step S4. When the clutch CL2 is in other states (disengaged or slip-engaged), control goes to step S5.

At step S4, first clutch CL1 is ON while second clutch CL2 is ON, so the control gain is set based on both inertias of engine E and motor generator MG, thereby executing computation of a basic torque down quantity.

At step S5, first clutch CL1 is ON while second clutch is OFF, so the control gain is set disregarding both inertias of engine E and motor generator MG, thereby executing computation of a basic torque down quantity.

At step S6, judgment is made as to whether second clutch CL2 is in the completely engaged state or not. When the clutch CL2 is in the completely engaged state, control goes to step S7. When the clutch CL2 is in other states (released or slip-engaged), control goes to step S8.

At step S7, first clutch CL1 is OFF while second clutch CL2 is ON, so the control gain is set based on the inertia of the motor generator MG, thereby executing computation of a basic torque down quantity.

At step S8, first clutch CL1 is OFF while second clutch CL2 is OFF, so the control gain is set disregarding both inertias of engine E and motor generator MG, thereby executing computation of a basic torque down quantity.

Next, an operation based on the above control flow is discussed. Explanation of the inertia decided by the gear-stage of automatic transmission AT is omitted because the inertia is not related to the engaging state of each clutch CL1, CL2.

Where CL1: ON and CL2: ON, the HEV mode is carried out, and the inertia of the power train corresponds to inertias of engine E and motor generator MG in the power source. Accordingly, control gains kPD, kID on the power source side are set at values that are obtained taking account of the inertias of engine E and motor generator MG, while control gains kPB, kIB by brake unit 900 are also set at values that are obtained taking account of the inertias of engine E and motor generator MG.

Where CL1: ON and CL2: OFF, the WSC mode is carried out, and the inertia of the power train corresponds to inertias of engine E and motor generator MG in the power source side. However, since second clutch CL2 is slip-engaged, the control gains kPD, kID on the power source side are rendered 0 while the control gains kPB, kIB by brake actuator 902 are enlarged so as to make a torque down by brake unit 900. It is unnecessary for kPB and kIB to take account of the inertia of motor generator MG.

Where CL1: OFF and CL2: ON, the EV mode is carried out, and the inertia of the power train corresponds to only inertia of motor generator MG. Accordingly, since the inertia of the power train is small as compared with that in the HEV mode, various gains are set to compute a small torque down quantity as compared with that in the HEV mode.

Where CL1: OFF and CL2: OFF, the MWSC mode is carried out, and the inertia of the power train corresponds to only inertia of motor generator MG as the power source. However, since second clutch CL2 is slip-engaged, control gains kPD, kID on the power source side are rendered 0 while control gains kPB, kIB by brake actuator 902 are enlarged so as to make a torque down by brake actuator 902. It is unnecessary for kPB and kIB to take account of the inertia of motor generator MG.

As discussed above, the following effects can be obtained in the first embodiment.

(1) The traction control system includes second clutch CL2 as a clutch element interposed between engine E and motor generator MG (hereinafter referred to as the power source) and the driving wheel to connect and disconnect the power source and the driving wheel. Second clutch hydraulic pressure unit 8 is a transmission torque capacity controlling device for controlling the transmission torque capacity of second clutch CL2 within a range from a complete disengagement to a complete engagement. Power source side deviation computing section 101c and brake side deviation computing section 101' are used as an acceleration slip detecting device for detecting or estimating an acceleration slip quantity of the driving wheel. Traction control section 101 functions as a torque controlling device for lowering a certain quantity a driving force transmitted from the driving wheel to a road surface according to the transmission torque capacity of second clutch CL2 by controlling a braking force of the power source and/or the driving wheel when the acceleration slip quantity is detected to be greater than a certain value. The traction control section 101 makes a lowering quantity of the driving force smaller as the transmission torque capacity is smaller.

In other words, when second clutch CL2 is slip-engaged, it is unnecessary to take account of the inertia of the power source. When second clutch CL2 is completely engaged, it is necessary to take account of the inertia of the power source. Thus, in the traction control, the torque down quantity is set according to the transmission torque capacity of second clutch CL2, i.e., according to the inertia of the power train, so that stable traction control can be achieved.

(2) Traction control section 101 is adapted to make the torque down quantity larger when second clutch CL2 is completely engaged than when second clutch CL2 is slip-engaged.

That is, when second clutch CL2 is completely engaged, it is necessary to enlarge the torque down quantity, taking account of the inertia of the power source. When second clutch CL2 is slip-engaged, it is unnecessary to take account of the inertia of the power source, and therefore the torque down quantity can be small and still be sufficient. By this, stable traction control can be achieved regardless of drive modes.

(3) Traction control section 101 is adapted to set the torque down quantity according to the transmission torque capacity of first clutch CL1 and the transmission torque capacity of the second clutch CL2.

Accordingly, in any of the EV mode, the HEV mode, the WSC mode or the MWSC mode, stable traction control can be achieved according to the inertia of the power train in each drive mode.

(4) Traction control section 101 is adapted to make the torque down quantity larger when second clutch CL2 is completely engaged while first clutch CL1 is engaged than when second clutch CL2 is completely engaged with first clutch CL1 is disengaged.

In other words, it is necessary to enlarge the torque down quantity, taking account of the inertia of engine E, when second clutch CL2 is completely engaged while first clutch CL1 is engaged. When first clutch CL1 is disengaged, it is unnecessary to take account of the inertia of engine E, and therefore the torque down quantity can be small and still be sufficient. By this, stable traction control can be achieved regardless of drive modes.

(5) Traction control section 101 is adapted to set the torque down quantity regardless of the transmission torque capacity of first clutch CL1 when second clutch CL2 is slip-engaged.

That is, when second clutch CL2 is slip-engaged, it is unnecessary to take account of the inertia of the power source as the inertia of the power train. By this, stable traction control can be achieved regardless of drive modes.

(6) The traction control system includes geared or staged automatic transmission AT, in which traction control section 101 is adapted to set the torque down quantity according to the inertia in each gear-stage of automatic transmission AT.

Accordingly, even if the inertia of the power train changes according to the gear-stages, stable traction control can be achieved.

(7) Traction control section 101 is adapted to lower the driving force transmitted from the driving wheel to the road surface by the command to throttle valve actuator E1 and brake unit 900, and to supply a command to synchronize the operation of the actuator that is the lowest in response speed in the plurality of actuators with the operation of the other actuators.

For example, when a torque down is carried out by the operation of throttle actuator E1 and by the operation of brake actuator 902, control gains kPB, kIB by brake actuator 902 are set smaller than control gains kPD, kID on the power source side where a torque down response by throttle actuator E1 is slow while a torque down response by brake actuator 902 is fast. By this, the phases of the torque down controls accomplished by both actuators can coincide with each other, thereby achieving a torque down without discomfort.

(8) Traction control section 101 is adapted to lower by a certain quantity the driving force transmitted from the driving wheel to the road surface by controlling the braking force of the driving wheel when second clutch CL2 is slip-engaged.

In other words, when traction control is operated in a state where second clutch CL2 is slip-engaged (the WSC mode and the MWSC mode), the torque on the power source side should be made smaller than the transmission torque quantity of second clutch CL2 in order to lower the output torque of the power train by the torque down on the power source side. By doing so, the slip state of second clutch CL2 is cancelled, possibly causing an engagement shock. Accordingly, at this time, the control gain on the power source side is rendered 0 while the control gain on the brake side is enlarged, thereby carrying out the torque down by brake actuator 902. By this, stable traction control can be achieved while suppressing engagement shock.

The previous explanation has been made based on the first embodiment; however, other configurations may be made without departing from the scope of the invention without being limited to the above-discussed configuration.

For example, in the first embodiment, the explanation has been made using examples of throttle actuator E1 and brake actuator 902 as the plurality of actuators. However, a configuration may be made such that traction control is executed according to the transmission torque capacity of second clutch CL2 in addition to the throttle actuator and the brake actuator.

As described, when second clutch CL2 is slip-engaged in the WSC mode or the MWSC mode, the operation of second clutch is basically decided according to the required driving force of the driver. At this time, the traction control section 101 may be arranged to output a command for lowering the transmission torque capacity of second clutch CL2.

If second clutch CL2 is used as the actuator at the time when second clutch CL2 is completely engaged as in the HEV mode or the EV mode, the inertia of the power train inevitably changes. In this case, carrying out a torque down by lowering the transmission torque capacity of second clutch CL2 invites complication of control, and therefore is not preferable although it is possible.

Additionally, while an explanation has been made where the control phases coincide with each other using throttle actuator E1 and brake actuator 902 as the plurality of actuators in the first embodiment, a limitation is not made by this. For example, when a variable valve timing actuator or the like are provided in addition to throttle actuator E1, control for causing the control phases to coincide with each may be included upon taking account of an actual influence on an output torque by those actuators.

Additionally, while the invention has been described as being applied to the hybrid vehicle, the invention may be similarly applied even to a vehicle that is not provided with a torque converter and is arranged to start under the engagement control of the starting clutch and the like. In other words, where traction control is carried out when the starting clutch is slip-engaged, the torque down quantity is made smaller than that at the time when the acceleration clutch is completely engaged. By this, effects similar to those according to the embodiment described above can be attained.

Similarly, the present invention may be applied to a vehicle in which a driving force distribution to four wheels is attained by a slip control for a clutch without being limited to a vehicle provided with the starting clutch. For example, inertia is different between a case in which four-wheel driving is attained under complete engagement of a clutch and a case in which a torque distribution is accomplished under slip control of a clutch. Accordingly, the torque down quantity by the traction control is set according to a difference in inertia.

Additionally, the FR type hybrid vehicle has been explained in the first embodiment. It may be replaced with a FF type hybrid vehicle.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A traction control system for driving wheels of a vehicle, comprising:
    a power source;
    a starting clutch having a variable transmission torque capacity and interposed between the power source and the driving wheels to connect and disconnect the power source and the driving wheels;
    a braking device associated with each of the driving wheels and capable of independently controlling a braking force to each wheel; and a controller configured to lower a driving force transmitted from the driving wheels to a road surface by controlling a driving torque of the power source and/or a braking force to the driving wheels when an acceleration slip in the driving wheels is above a certain value and further configured to reduce a lowering quantity of the driving force as the variable transmission torque capacity of the starting clutch decreases.

2. The traction control system as in claim 1 wherein the controller is further configured to further reduce the lowering quantity of the driving force when the starting clutch is slip-engaged below that at a time when the starting clutch is completely engaged.

3. The traction control system as in claim 1 wherein
the power source includes an engine and a motor disposed at a power output side of the engine;
the traction control system includes an engine clutch for connecting and disconnecting the engine and the motor;
the starting clutch is interposed between the motor and the driving wheels; and
the controller is further configured to set the lowering quantity of the driving force according to the variable transmission torque capacity of the starting clutch and a transmission torque capacity of the engine clutch.

4. The traction control system as in claim 3 wherein the controller is further configured to increase the lowering quantity of the driving force when the starting clutch is engaged while the engine clutch is engaged above that at a time when the engine clutch is disengaged.

5. The traction control system as in claim 3 wherein the controller is further configured to set the lowering quantity of the driving force regardless of the transmission torque capacity of the engine clutch when the starting clutch is slip-engaged.

6. The traction control system as in claim 1, further comprising:
a geared automatic transmission interposed between the power source and the driving wheels; and wherein
the controller is further configured to set the lowering quantity of the driving force according to an inertia at each gear-stage of the geared automatic transmission.

7. The traction control system as in claim 1 wherein the controller is further configured to lower the driving force transmitted from the driving wheels to the road surface by making a command to plural actuators and to output to the plural actuators a command for synchronizing an operation of an actuator that is the slowest in response speed of the plural actuators with operations of the other actuators.

8. The traction control system as in claim 1 wherein the controller is further configured to lower the driving force transmitted from the driving wheels to the road surface by controlling the braking force of the driving wheels when the starting clutch is slip-engaged.

9. The traction control system as in claim 1, further comprising:
an acceleration slip quantity detecting part for detecting or estimating an acceleration slip in the driving wheels.

10. A traction control system controller for driving wheels of a vehicle comprising a power source, a starting clutch having a variable transmission torque capacity and interposed between the power source and the driving wheels to connect and disconnect the power source and the driving wheels, a braking device associated with each of the driving wheels and capable of independently controlling a braking force to each wheel, the controller comprising:
means for lowering a driving force transmitted from the driving wheels to a road surface by controlling a driving torque of the power source and/or a braking force to the driving wheels when an acceleration slip of the driving wheels is above a certain value; and
means for reducing a lowering quantity of the driving force as the variable transmission torque capacity of the starting clutch decreases.

11. A method of controlling a traction control system for driving wheels of a vehicle comprising a power source, a starting clutch having a variable transmission torque capacity and interposed between the power source and the driving wheels to connect and disconnect the power source and the driving wheels, a braking device associated with each of the driving wheels and capable of independently controlling a braking force to each wheel, the method comprising:
lowering a driving force transmitted from the driving wheels to a road surface by controlling a driving torque of the power source and/or a braking force to the driving wheels when an acceleration slip of the driving wheels is above a certain value; and
reducing a lowering quantity of the driving force as the variable transmission torque capacity of the starting clutch decreases.

12. The method as in claim 11, further comprising:
further reducing the lowering quantity of the driving force when the starting clutch is slip-engaged below that at a time when the starting clutch is completely engaged.

13. The method as in claim 11 wherein the power source includes an engine and a motor disposed at a power output side of the engine, the traction control system includes an engine clutch for connecting and disconnecting the engine and the motor, and the starting clutch is interposed between the motor and the driving wheels, further comprising:
setting the lowering quantity of the driving force according to the variable transmission torque capacity of the starting clutch and a transmission torque capacity of the engine clutch.

14. The method as in claim 13, further comprising:
increasing the lowering quantity of the driving force when the starting clutch is engaged while the engine clutch is engaged above that at a time when the engine clutch is disengaged.

15. The method as in claim 13, further comprising:
setting the lowering quantity of the driving force regardless of the transmission torque capacity of the engine clutch when the starting clutch is slip-engaged.

16. The method as in claim 11 wherein a geared automatic transmission is interposed between the power source and the driving wheels, the method further comprising:
setting the lowering quantity of the driving force according to an inertia at each gear-stage of the geared automatic transmission.

17. The method as in claim 11, further comprising:
lowering the driving force transmitted from the driving wheels to the road surface by making a command to plural actuators; and
outputting to the plural actuators a command for synchronizing an operation of an actuator that is the slowest in response speed of the plural actuators with operations of the other actuators.

18. The method as in claim 11, further comprising:
lowering the driving force transmitted from the driving wheels to the road surface by controlling the braking force of the driving wheels when the starting clutch is slip-engaged.

* * * * *